United States Patent
Bradley et al.

(10) Patent No.: US 12,435,605 B2
(45) Date of Patent: Oct. 7, 2025

(54) TANDEM SUB FOR SELF-ORIENTING PERFORATING SYSTEM

(71) Applicant: Hunting Titan, Inc., Pampa, TX (US)

(72) Inventors: Ryan Bradley, Pampa, TX (US); Julio Cesar Veliz, Cypress, TX (US)

(73) Assignee: Hunting Titan, Inc., Pampa, TX (US)

( * ) Notice: Subject to any disclaimer, the term of this patent is extended or adjusted under 35 U.S.C. 154(b) by 0 days.

(21) Appl. No.: 18/816,818

(22) Filed: Aug. 27, 2024

(65) Prior Publication Data

US 2024/0418061 A1    Dec. 19, 2024

Related U.S. Application Data

(63) Continuation-in-part of application No. 18/604,435, filed on Mar. 13, 2024, now Pat. No. 12,228,019, which is a continuation of application No. 18/310,352, filed on May 1, 2023, now Pat. No. 11,959,367, which is a continuation of application No. 17/821,784, filed on Aug. 23, 2022, now Pat. No. 11,674,371, which is a continuation of application No. PCT/US2022/073443, filed on Jul. 5, 2022.

(60) Provisional application No. 63/301,950, filed on Jan. 21, 2022.

(51) Int. Cl.
| | | |
|---|---|---|
| *E21B 43/119* | (2006.01) | |
| *E21B 43/117* | (2006.01) | |
| *F42B 3/02* | (2006.01) | |
| *F42B 3/103* | (2006.01) | |

(52) U.S. Cl.
CPC .......... *E21B 43/119* (2013.01); *E21B 43/117* (2013.01); *F42B 3/02* (2013.01); *F42B 3/103* (2013.01)

(58) Field of Classification Search
CPC .... E21B 43/119; E21B 43/116; E21B 43/117; E21B 43/1185; E21B 29/02; F42B 3/02; F42B 3/103; F42D 1/045; F16C 19/06; F16C 19/30; F16C 2202/32; F16C 2352/00
USPC .... 166/297, 55, 255.2, 55.1; 175/4.53–4.59; 89/1.15
See application file for complete search history.

(56) References Cited

U.S. PATENT DOCUMENTS

| | | |
|---|---|---|
| 4,949,793 A | 8/1990 | Rubbo et al. |
| 6,595,290 B2 | 7/2003 | George et al. |
| 9,115,572 B1 * | 8/2015 | Hardesty .............. E21B 43/119 |
| 9,382,784 B1 | 7/2016 | Hardesty et al. |
| 9,689,223 B2 | 6/2017 | Schacherer et al. |
| 9,903,185 B2 | 2/2018 | Ursi et al. |

(Continued)

FOREIGN PATENT DOCUMENTS

| | | |
|---|---|---|
| WO | 2021116338 A1 | 6/2021 |
| WO | PCTUS2273443 | 7/2022 |

OTHER PUBLICATIONS

PCT Written Opinion of the International Search Authority, Dated Oct. 26, 2022, 12 pages.

*Primary Examiner* — Michael D David
(74) *Attorney, Agent, or Firm* — Troutman Pepper Locke LLP; Gabrielle L. Gelozin (57) ABSTRACT

A method and apparatus for using a tandem sub to connect one or more perforating gun assemblies using a rotational bearing mechanism contained within a sleeve lining the inner diameter in both ends to allow the charge tube assembly to rotate within the gun body and protect the tandem sub from damage when firing the shaped charges.

20 Claims, 11 Drawing Sheets

(56) References Cited

U.S. PATENT DOCUMENTS

| | | | |
|---|---|---|---|
| 10,689,955 | B1 | 6/2020 | Mauldin et al. |
| 10,844,697 | B2 * | 11/2020 | Preiss ..................... F42D 1/043 |
| 11,078,762 | B2 * | 8/2021 | Mauldin ............. E21B 43/1185 |
| 11,674,371 | B1 | 6/2023 | Bradley et al. |
| 2003/0098158 | A1 | 5/2003 | George et al. |
| 2006/0075889 | A1 | 4/2006 | Walker |
| 2006/0102352 | A1 | 5/2006 | Walker et al. |
| 2006/0108148 | A1 | 5/2006 | Walker et al. |
| 2015/0226044 | A1 | 8/2015 | Ursi et al. |
| 2016/0208587 | A1 | 7/2016 | Hardesty et al. |
| 2020/0308938 | A1 | 10/2020 | Sullivan et al. |
| 2021/0222525 | A1 | 7/2021 | Dyess et al. |
| 2022/0170348 | A1 | 6/2022 | Bryant et al. |

\* cited by examiner

TANDEM SUB FOR SELF-ORIENTING PERFORATING SYSTEM

RELATED APPLICATIONS

This application is a continuation in part of U.S. application Ser. No. 18/604,435, filed Mar. 13, 2024, which is a continuation of U.S. application Ser. No. 18/310,352, filed May 1, 2023, which is a continuation of U.S. application Ser. No. 17/821,784 filed on Aug. 23, 2022, which is a bypass continuation of PCT/US22/73443 filed on Jul. 5, 2022, which claims priority to U.S. Provisional Application No. 63/301,950, filed Jan. 21, 2022.

BACKGROUND

Generally, when completing a subterranean well to produce fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically, a wellbore will be drilled from a surface location, placing a hole into a formation of interest. Completion equipment will be put into place, including casing, tubing, and other downhole equipment as needed. Perforating the casing and the formation with a perforating gun is a well-known method in the art for accessing hydrocarbon deposits within a formation from a wellbore.

Explosively perforating the formation using a shaped charge is a widely known method for completing an oil well. A shaped charge is a term of art for a device that when detonated generates a focused output, high energy output, and/or high velocity jet. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates, the liner metal is compressed into a superheated, super pressurized jet that can penetrate metal, concrete, and rock. Perforating charges are typically used in groups. These groups of perforating charges are typically held together in an assembly called a perforating gun. Perforating guns come in many styles, such as strip guns, capsule guns, port plug guns, and expendable hollow carrier guns.

Perforating charges are typically detonated by a detonating cord in proximity to a priming hole at the apex of each charge case. Typically, the detonating cord terminates proximate to the ends of the perforating gun. In this arrangement, an initiator at one end of the perforating gun can detonate all the perforating charges in the gun and continue a ballistic transfer to the opposite end of the gun. In this fashion, numerous perforating guns can be connected end to end with a single initiator detonating all of them.

The detonating cord is typically detonated by an initiator triggered by a firing head. The firing head can be actuated in many ways, including but not limited to electronically, hydraulically, and mechanically.

Expendable hollow carrier perforating guns are typically manufactured from standard sizes of steel pipe with a box end having internal/female threads at each end. Pin ended adapters, or subs, having male/external threads are threaded one or both ends of the gun. These subs can connect perforating guns together, connect perforating guns to other tools such as setting tools and collar locators, and connect firing heads to perforating guns. Subs often house electronic, mechanical, or ballistic components used to activate or otherwise control perforating guns and other components.

Perforating guns typically have a cylindrical gun body and a charge tube or loading tube that holds the perforating charges. The gun body typically is composed of metal and is cylindrical in shape. Charge tubes can be formed as tubes, strips, or chains. The charge tubes will contain cutouts called charge holes to house the shaped charges.

It is generally preferable to reduce the total length of any tools to be introduced into a wellbore. Among other potential benefits, reduced tool length reduces the length of the lubricator necessary to introduce the tools into a wellbore under pressure. Additionally, reduced tool length is also desirable to accommodate turns in a highly deviated or horizontal well. It is also generally preferable to reduce the tool assembly that must be performed at the well site because the well site is often a harsh environment with numerous distractions and demands on the workers on site.

Electric initiators are commonly used in the oil and gas industry for initiating different energetic devices down hole. Most commonly, 50-ohm resistor initiators are used. Other initiators and electronic switch configurations are common.

Modular or "plug and play" perforating gun systems have become increasingly popular in recent years due to the case of assembly, efficiencies gained, and reduced human error. Most of the existing plug and play systems either (1) utilize a wired in switch and/or detonator, or (2) require an initiating "cartridge" that houses the detonator, switch, electrical contacts and possibly a pressure bulkhead. The wired in switch/detonator option is less desirable, because the gun assembler must make wire connections which is prone to human error. The initiating cartridge option is less desirable because the cartridge can be a large explosive device-in comparison to a standard detonator-thus takes up additional magazine space at the user facility.

Conventional perforating in vertical wells or unconventional perforating in horizontal wells conveyed by electrical line during which one or more of the perforating guns in the downhole tool string are oriented by either one or more of the following orientating methods: motorized orientation tool, eccentric weight bars and self-orienting charge tube assemblies.

Oriented perforating is a completion method used to connect to the reservoir formation in a specific transverse plane or to avoid perforating other wellbore tubulars and data lines, such as fiber optic cable, attached to the inside or outside of the casing which is being perforated.

SUMMARY OF EXAMPLE EMBODIMENTS

An example embodiment may include a tandem sub, used to connect one or more perforating gun assemblies, comprising a first rotational bearing mechanism located at a first end, wherein the first rotational bearing mechanism is adapted to engage with a first charge tube in a first perforating gun and allow the first charge tube to rotate freely, a second rotational bearing mechanism located at a second end, wherein the second rotational bearing mechanism is adapted to engage with a second charge tube in a second perforating gun and allow the second charge tube to rotate freely, and an outer tandem housing, wherein the outer housing is adapted to engage a first outer gun housing of the first perforating gun and engage a second outer gun housing of the second perforating gun.

A variation of the example embodiment may include the tandem further comprising of a feed through bulkhead installed within a through passage, wherein the feed through bulkhead provides an electric contact between the first perforating gun and the second perforating gun while further providing a pressure seal between the first perforating gun and the second perforating gun. It may include a first bearing retention nut coupled to the first rotation bearing mechanism, wherein the first bearing retention nut retains and protects the first rotational bearing mechanisms. It may include a second bearing retention nut coupled to the second rotation bearing mechanism, wherein the second bearing retention nut retains and protects the first rotational bearing mechanisms. The first rotation bearing mechanism may be a needle bearing. The second rotation bearing mechanism may be a needle bearing.

An example embodiment may include a perforating gun system comprising a first perforating gun with a first charge tube, a second perforating gun with a second charge tube, a first tandem sub, used to connect one or more perforating gun assemblies, further comprising: a first rotational bearing mechanism located at a first end, wherein the first rotational bearing mechanism is coupled with the first charge tube in the first perforating gun, and a second rotational bearing mechanism located at a second end, wherein the second rotational bearing mechanism is coupled with the second charge tube in the second perforating gun.

A variation of the example embodiment may include a feed through bulkhead installed within a through passage in the first tandem sub, wherein the feed through bulkhead provides an electric contact between the first perforating gun and the second perforating gun while further providing a pressure seal between the first perforating gun and the second perforating gun. It may include a top end fitting coupling a first end of the first charge tube to the first rotational bearing mechanism, wherein the top end fitting is made of non-conductive material. It may include an electrical contact protruding outward from the top end fitting into the feed through bulkhead. It may include a wired connection connecting the top end fitting electrical contact to the input wire of a controller switch contained within the top end fitting. It may include a through wire running the length of the first charge tube connecting an output wire of the controller switch to the electrical contact on a bottom end fitting. It may include a bottom end fitting on a second end of the charge tube. The bottom end fitting is composed of non-conductive material with an electrical contact protruding outward from the center of the bottom end fitting body. The top end fitting of the first charge tube assembly is supported by the first rotational bearing mechanisms in the first tandem sub. It may include the first tandem sub having an outer tandem housing, wherein the outer housing is adapted to engage a first outer gun housing of the first perforating gun and engage a second outer gun housing of the second perforating gun. The first charge tube may be weighted and freely rotates within the first perforating gun. The second charge tube may be weighted and freely rotates within the second perforating gun.

An example embodiment may include a perforating gun system comprising a first perforating gun having a charge tube containing one or more perforating charges and an eccentric weight, a first tandem sub further comprising a first rotational bearing mechanism located at a first end, wherein the first rotational bearing mechanism is coupled to a first end of the first charge cradle counterweight in the first perforating gun, and a second rotational bearing mechanism located at a second end, a second tandem sub further comprising, a first rotational bearing mechanism located at a first end, and a second rotational bearing mechanism located at a second end, wherein the second rotational bearing mechanism is coupled to a second end of the first charge cradle counterweight in the first perforating gun.

A variation of the example embodiment may include a first feed through bulkhead installed within a through passage in the first tandem sub and a second feed through bulkhead installed within a through passage in the second tandem sub. It may include a top end fitting coupling a first end of the first charge cradle counterweight to the first rotational bearing mechanism, wherein the top end fitting is made of non-conductive material. It may include an electrical contact protruding outward from the top end fitting into the feed through bulkhead. It may include a wired connection connecting the top end fitting electrical contact to the input wire of a controller switch contained within the top end fitting. It may include a through wire running the length of the charge cradle counterweight connecting an output wire of the controller switch to the electrical contact on a bottom end fitting. It may include a bottom end fitting on a second end of the charge cradle counterweight. The bottom end fitting is composed of non-conductive material with an electrical contact protruding outward from the center of the bottom end fitting body. The top end fitting of the first charge cradle counterweight is supported by the first rotational bearing mechanisms in the first tandem sub. The bottom end fitting of the first charge cradle counterweight may be supported by the second rotational bearing mechanisms in the second tandem sub. The center contacts in the top end fitting and bottom end fitting of the first charge cradle counterweight may electrically couple the first bulkhead feed through with the second bulkhead feed through. It may include a plurality of shape charges, each contained in a shaped charge holder that snaps into a set of parallel rails that are integral to the charge cradle counterweight.

BRIEF DESCRIPTION OF THE DRAWINGS

For a thorough understanding of the example embodiments, reference is made to the following detailed description of the preferred embodiments, taken in conjunction with the accompanying drawings in which reference numbers designate like or similar elements throughout the several figures of the drawing. Briefly.

DETAILED DESCRIPTION OF THE EXAMPLE EMBODIMENTS

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Terms such as booster may include a small metal tube containing secondary high explosives that are crimped onto the end of detonating cord. The explosive component is designed to provide reliable detonation transfer between perforating guns or other explosive devices, and often serves as an auxiliary explosive charge to ensure detonation.

Detonating cord is a cord containing high-explosive material sheathed in a flexible outer case, which is used to connect the detonator to the main high explosive, such as a shaped charge. This provides an extremely rapid initiation sequence that can be used to fire several shaped charges simultaneously.

A detonator or initiation device may include a device containing primary high-explosive material that is used to initiate an explosive sequence, including one or more shaped charges. Two common types may include electrical detonators and percussion detonators. Detonators may be referred to as initiators. Electrical detonators have a fuse material that burns when high voltage is applied to initiate the primary high explosive. Percussion detonators contain abrasive grit and primary high explosive in a sealed container that is activated by a firing pin. The impact of the firing pin is sufficient to initiate the ballistic sequence that is then transmitted to the detonating cord.

Initiators may be used to initiate a perforating gun, a cutter, a setting tool, or other downhole energetic device. For example, a cutter is used to cut tubulars with focused energy. A setting tool uses a pyrotechnic to develop gases to perform work in downhole tools. Any downhole device that uses an initiator may be adapted to use the modular initiator assembly disclosed herein.

Traditional methods to orient perforating guns in a horizontal well involve installing eccentric weight bars above, below or above and below the perforating guns so that the entire gun tool string will rotate due to gravity such that the weighted side of the eccentric weight bars are on the low side of the horizontal well. The guns in a traditional oriented perforating string can be locked into a desired shot position, in relation to the weighted side of the eccentric weights, utilizing lock collar tandems between each gun. These traditional orienting methods can be inaccurate (+/−30 degrees) due to well casing conditions and involve adding lengthy eccentric weight bars and lock collar tandems to the string.

Eccentric weight bars are specialized components used in downhole perforation systems to aid in the orientation of perforating guns within a wellbore, particularly in horizontal or highly deviated wells. These weight bars are strategically placed above, below, or both above and below the perforating guns in the tool string, adding a deliberate imbalance or eccentricity to the assembly. Due to gravity, this imbalance causes the perforating gun assembly to rotate such that the heavier, weighted side aligns with the low side of the wellbore. This precise alignment ensures that the perforation charges are directed optimally within the well, either targeting specific formations or avoiding sensitive areas such as casing walls or data lines. Lock collar tandems are mechanical connectors that secure the orientation of the perforating guns relative to the eccentric weight bars once the desired alignment is achieved. By locking the perforating gun in place, lock collar tandems prevent any unintentional rotation or misalignment during the perforation process, ensuring consistent and accurate perforation across the entire gun string. Together, eccentric weight bars and lock collar tandems contribute significantly to the precision and effectiveness of the perforation process, particularly in complex wellbore geometries.

There is a need for a simple self-orienting perforating gun system that does not overly increase the cost or length of the perforating tool string. The proposed example embodiments of self-orienting perforating systems may contain tandem subs with a bearing mechanism lining the inner diameter of both ends of said tandem subs such that a self-orienting perforating gun, comprising of a charge tube assembly with counterweighted sections, assembled between two such tandem subs can rotate within the gun carrier due to gravity when the perforating tool string is positioned in a horizontal well. The weighted sections of the charge tube assembly may not increase the length of the perforating gun. The bearing mechanism lining the inner diameter of each end on the tandem sub may be non-disposable and re-usable for cost savings.

Figure 1:
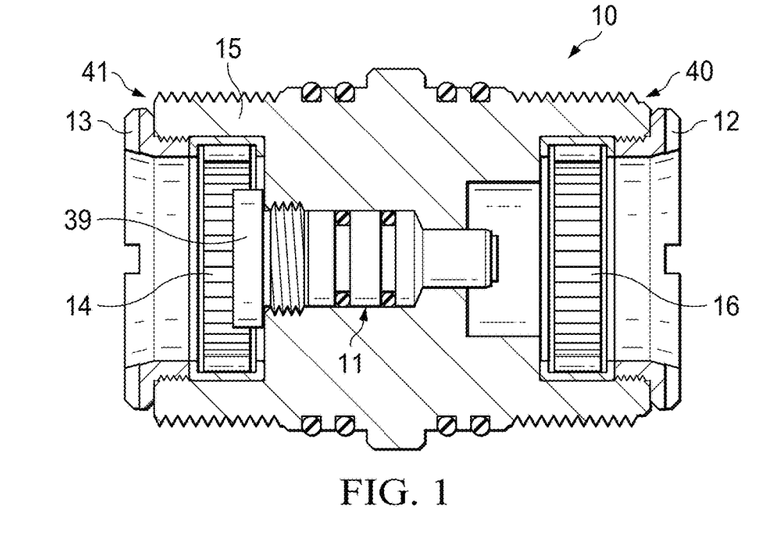
FIG. 1 shows an example embodiment of an orientating tandem sub.
Figure 2:
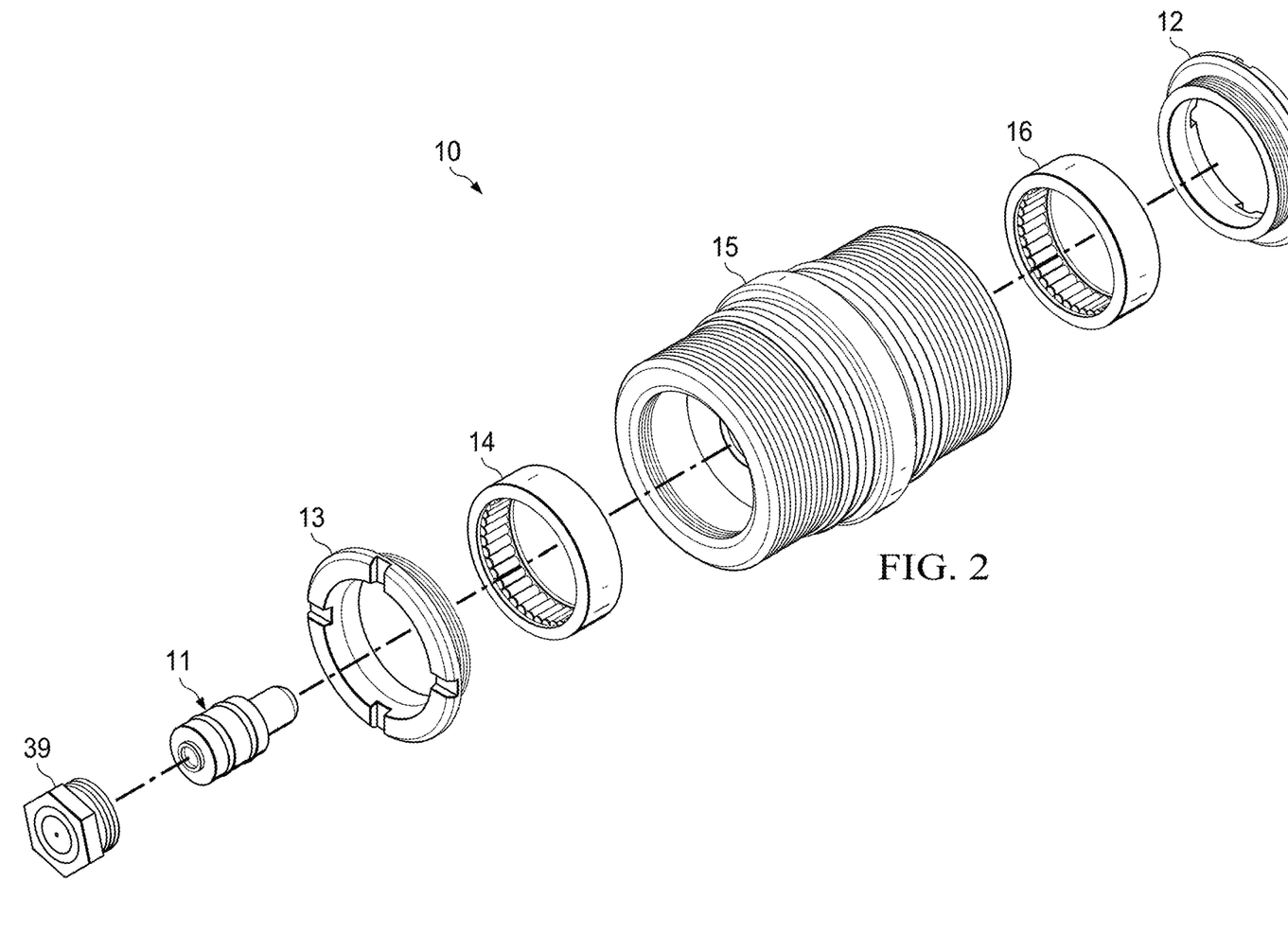
FIG. 2 shows an assembly view of an example embodiment of an orientating tandem sub.

An example embodiment in FIGS. 1 and 2 includes an orienting tandem sub comprising a rotational bearing mechanism lining the inner diameter of both ends such that the charge tube assembly within a perforating gun body assembled between two such tandem subs can rotate within the gun body due to gravity when the perforating tool string is positioned in a horizontal well. The rotational bearing mechanism in the inner diameter of each end of the orienting tandem sub is designed to support each end of the charge tube assembly within the gun body of the self-orienting perforating gun such that the entire charge tube assembly can rotate within the gun body. The self-orienting perforating gun, between the orienting tandem subs, comprises a gun body and a charge tube assembly with counterweighted sections within the gun body. The orienting tandem sub contains threaded connections on both ends to attach a threaded gun assembly so that the gun body and tandem sub cannot rotate in relation to each other once assembled. The orienting tandem sub contains a feed through bulkhead along its center axis that allows electrical continuity from the charge tube assembly of the gun above through the tandem to the next gun charge tube assembly in the gun below as well as provide a pressure seal between the gun below and the gun above. The charge tube assembly of the self-orienting perforating gun has conductive contacts centered on each end to contact either end of the feed through bulkhead of the tandem sub when the perforating gun is assembled between two tandem subs. A bearing retention nut is installed on both ends of the orienting tandem between the end of the tandem body and the rotational bearing mechanism. The bearing retention nut protects the rotational bearing mechanism from the perforating gun blast such the rotational bearing mechanism can be re-used.

An example embodiment as shown in FIGS. 1 and 2, may include an orienting tandem sub 10. The orienting tandem sub 10 includes a cylindrical tandem body 15 with outer o-rings to seal and engage with two perforating guns, a first perforating gun can engage with first end 40 and a second perforating gun can engage with second end 41. The tandem body 15 has a through hole adapted to accept a feed through bulkhead 11 held in place by nut 39. The first end 40 includes a first bearing retention nut 12 that includes a first rotational bearing mechanism 16. The second end 41 includes a second bearing retention mechanism 13 that includes a second rotational bearing mechanism 14. The first and second rotational bearing mechanisms 13 and 14 may be a needle roller bearing, a tapered roller bearing, a spherical roller bearing, a cylindrical roller bearing, or a ball bearing design, using a caged roller configuration or a full complement configuration.

Figure 3:
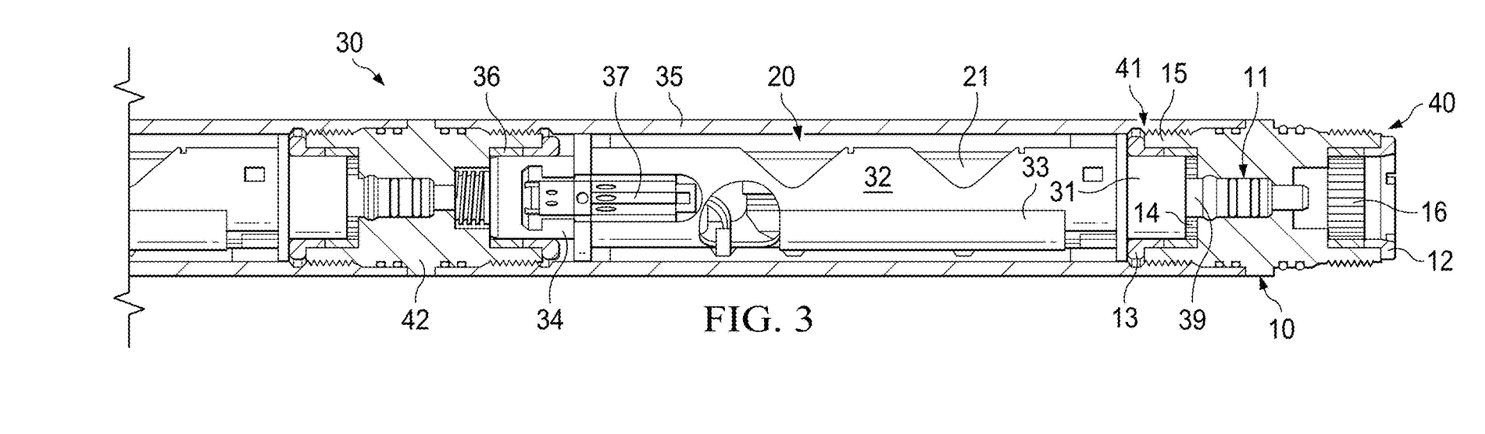
FIG. 3 shows an example embodiment of an orientating tandem sub connecting two perforating guns.
Figure 4:
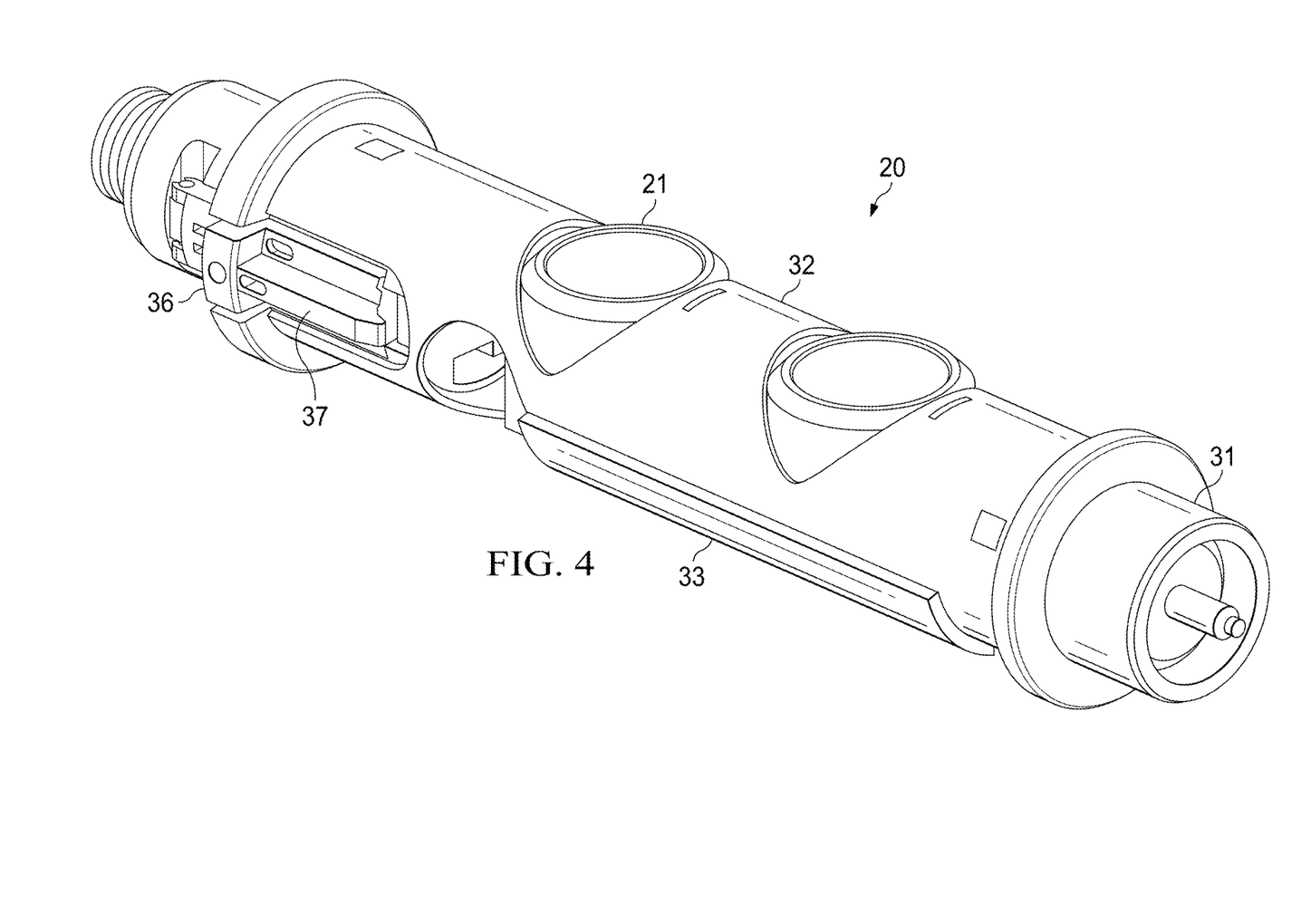
FIG. 4 shows an example embodiment of an orientating tandem sub coupled to the charge tube of a perforating gun.

An example embodiment of a multi-gun assembly 30 is shown in FIG. 3 and FIG. 4. An orienting tandem sub 10 is coupled to a perforating gun 20. The carrier gun housing 35 is coupled to the tandem body 15. The second bearing retention mechanism 13, using the second rotational bearing mechanism 14, is coupled to the charge tube 32 via the end fitting 31. Charge tube 32 includes a counterweight 33. Charge tube 32 includes shaped charges 21. Charge tube 32 is coupled to the rotational bearing mechanism 36 of the second orienting tandem sub 42 via end fitting 34. A detonator assembly 37 is explosively coupled to the shaped charges 21 via a detonating cord. Further, the detonator assembly 37 is shown as being a cartridge design with a door 36 adapted to accept a cartridge style detonator.

Figure 5:
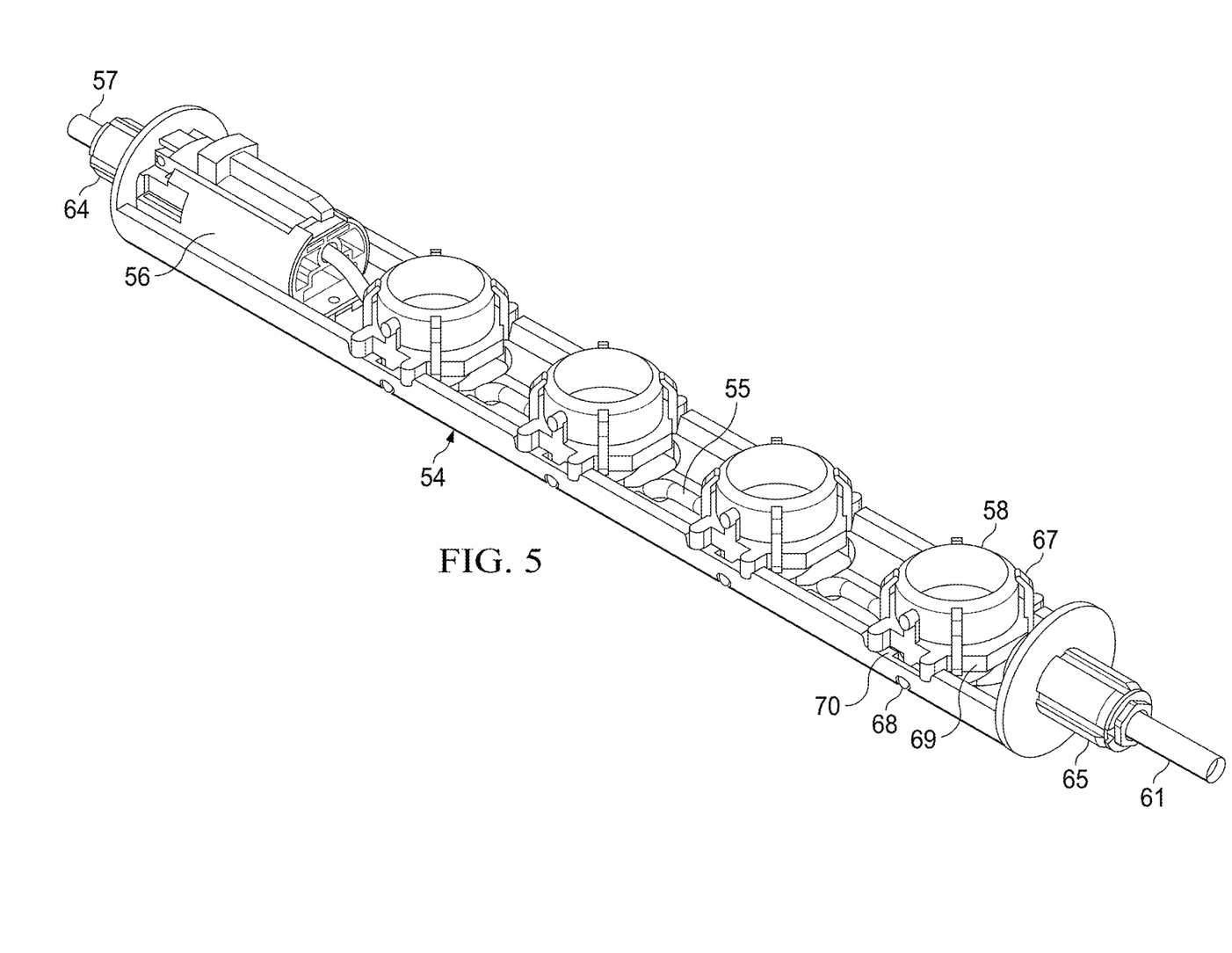
FIG. 5 shows an example embodiment of a gun charge cradle assembly carrier.
Figure 6:
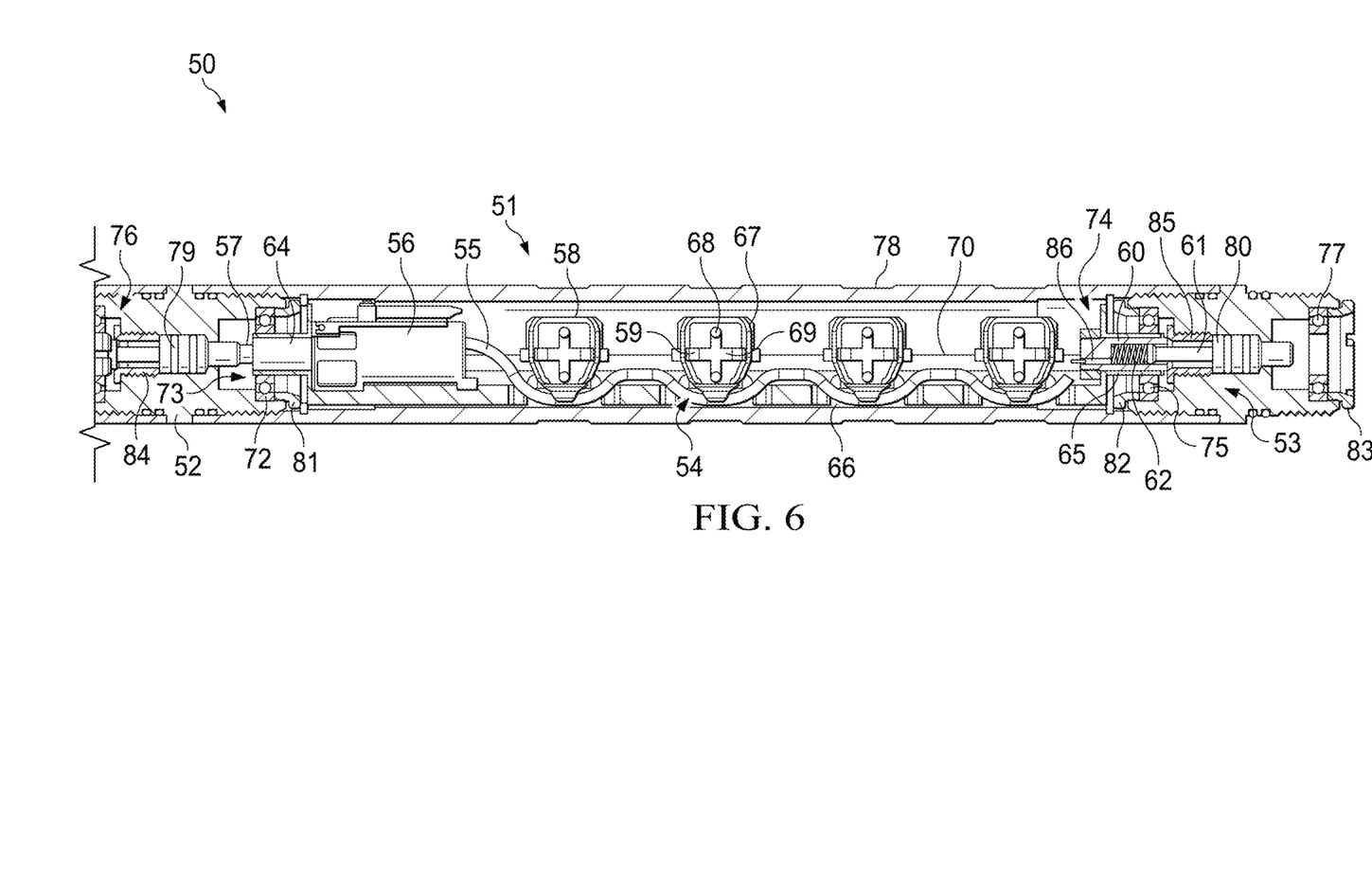
FIG. 6 shows an example embodiment of a gun charge cradle assembly carrier.
Figure 7:
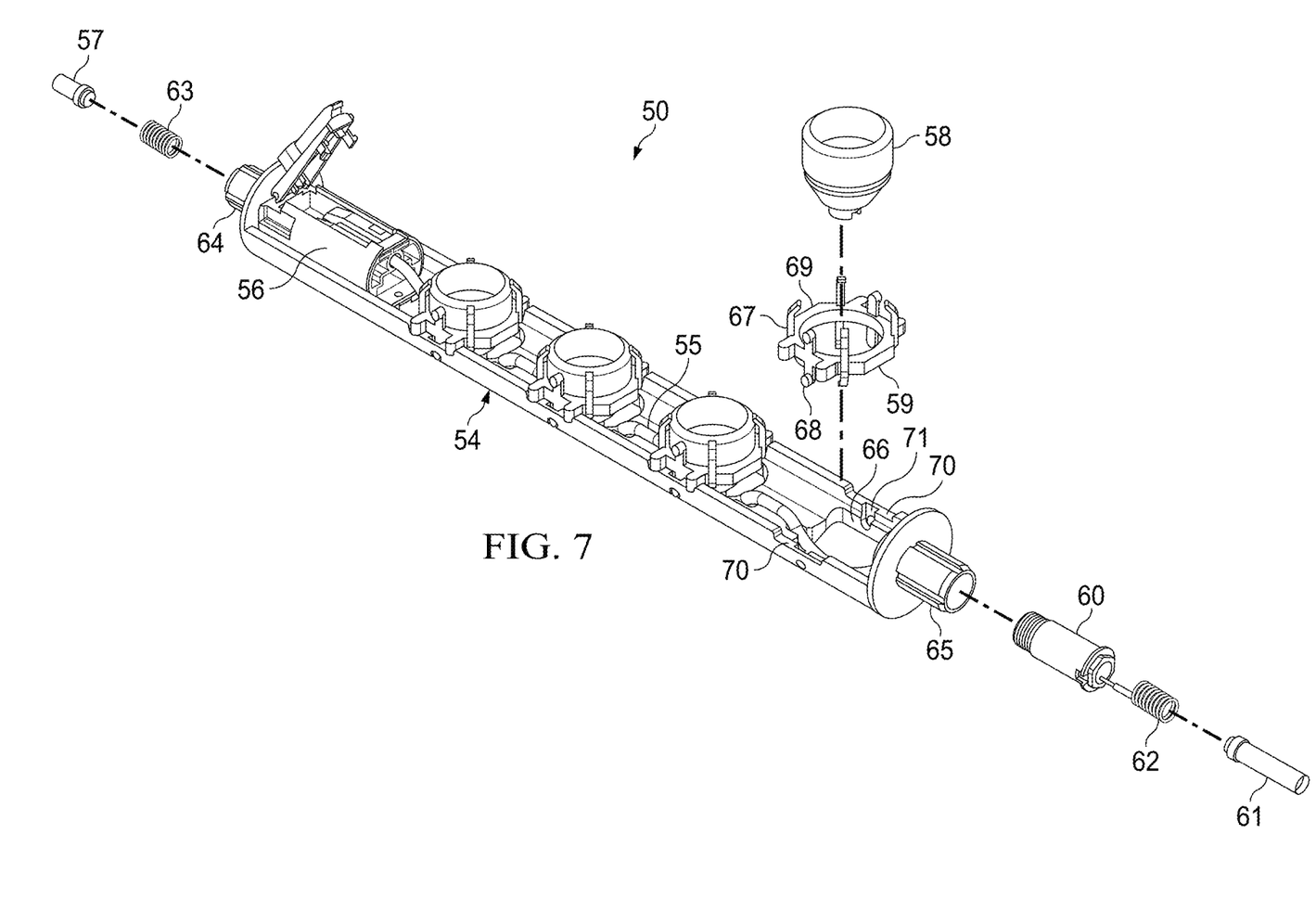
FIG. 7 shows an example embodiment of a gun charge cradle assembly carrier.

An example embodiment is shown in FIG. 5-7 of a gun charge cradle assembly 50. The charge cradle counterweight 54 contains shaped charges 58. Each shaped charge 58 is held in place by a charge retainer 59. The charge retainer 59 includes a retainer body 69 includes a plurality of fingers 67 for holding the shaped charge 58 and clips 68 for clipping into the locking holes 71 of the charge cradle counterweight 54. This secures the retainer body 69 to the cradle rails 70. A detonating cord 55 runs from the top end fitting 56 and is explosively coupled to the back of each shaped charge 58 via a plurality of cutouts 66. The top end fitting 56 may include an integrated control fire switch. The charge cradle counterweight includes bearings 64 and 65. A spring 63 and contact 57 are disposed within the bearing 64. A spring 62 and contact 61 with contact wire 86 are disposed in a contact insulator 60, which is further disposed within the bearing 65.

Referring to FIGS. 5-7, tandem 52 includes a body 76 with a bulkhead 79 held in place by retainer nut 79. Contact subassembly 73 includes bearing 72 held in place by bearing nut 81. Tandem 53 includes a retainer nut 85 holding a bulkhead 80 in place. It includes bearing nut 82 holding the bearing 75 in place. It includes a bearing 77 held in place by bearing nut 83. The gun charge cradle assembly 50 is placed within a gun body 51 which is coupled to the first tandem sub 52 and the second tandem sub 53. The gun body 51 includes scallops 78. The contact subassembly 74 couples to the bearing 75.

Figure 8:
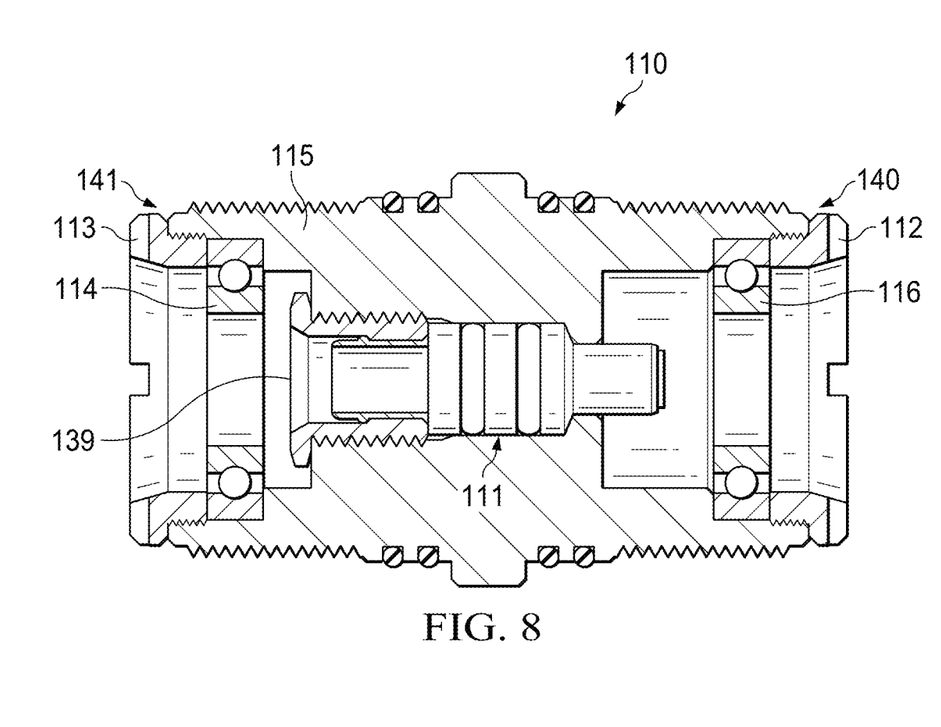
FIG. 8 shows an example embodiment of an orientating tandem sub.
Figure 9:
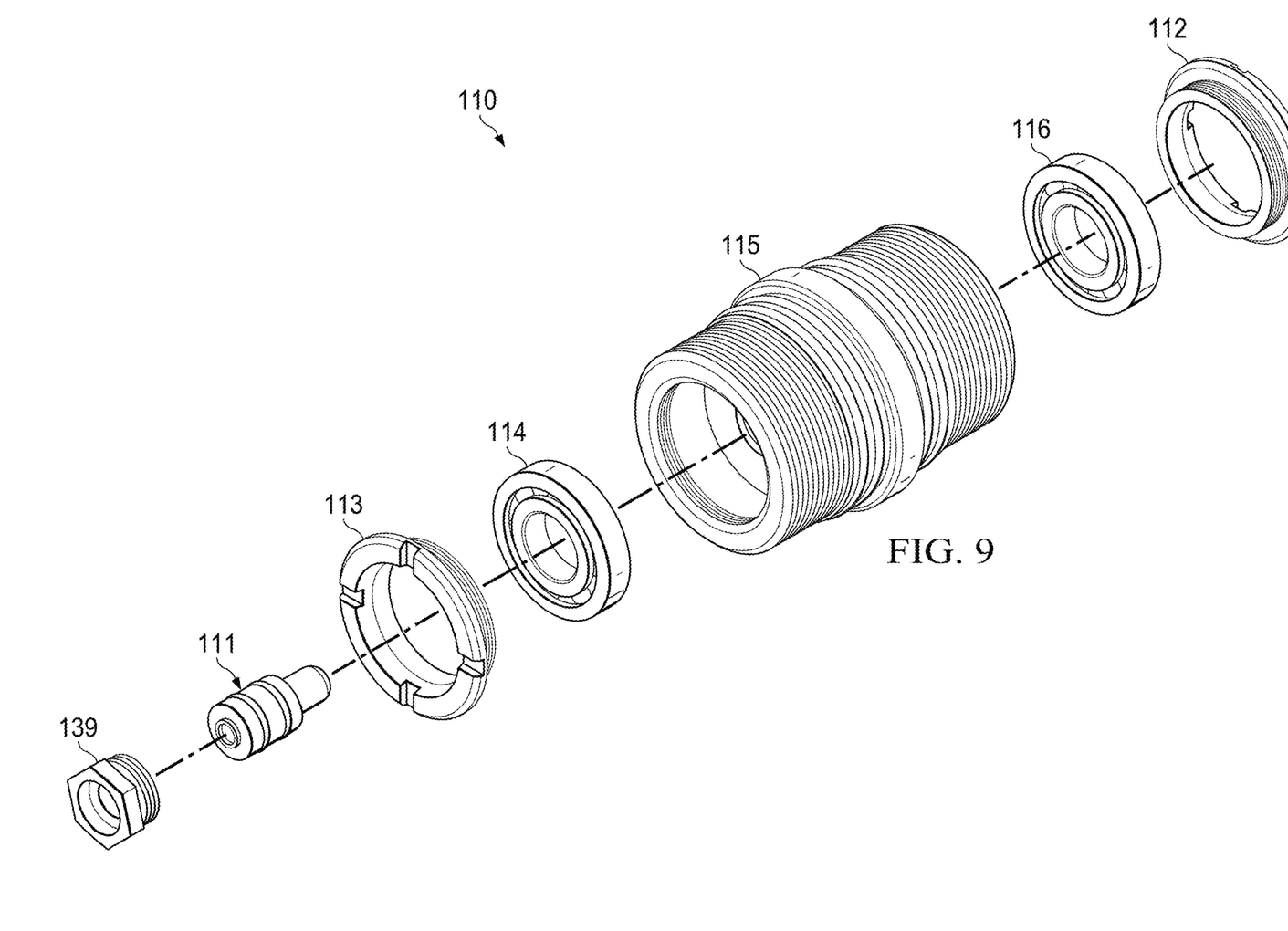
FIG. 9 shows an example embodiment of an orientating tandem sub.

An example embodiment as shown in FIGS. 8 and 9, may include an orienting tandem sub 10. The orienting tandem sub 110 includes a cylindrical tandem body 115 with outer o-rings to seal and engage with two perforating guns, a first perforating gun can engage with first end 140 and a second perforating gun can engage with second end 141. The tandem body 115 has a through hole adapted to accept a feed through bulkhead 111 held in place by nut 139. The first end 140 includes a first bearing retention nut 112 that includes a first rotational bearing mechanism 116. The second end 141 includes a second bearing retention mechanism 113 that includes a second rotational bearing mechanism 114. The first and second rotational bearing mechanisms 113 and 114 may be a needle roller bearing, a tapered roller bearing, a spherical roller bearing, a cylindrical roller bearing, or a ball bearing design, using a caged roller configuration or a full complement configuration.

Figure 10:
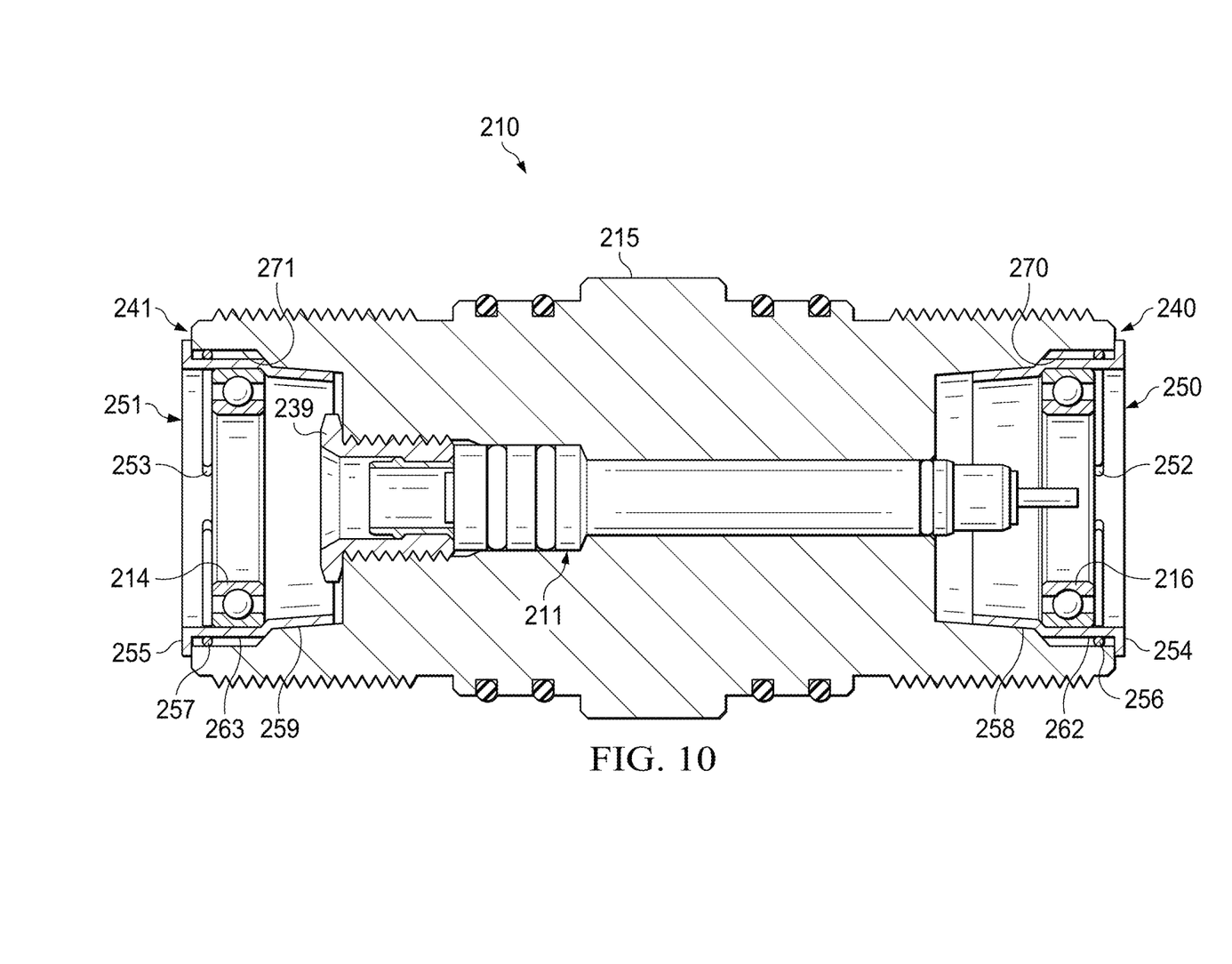
FIG. 10 shows an example embodiment of an orienting tandem sub.
Figure 11:
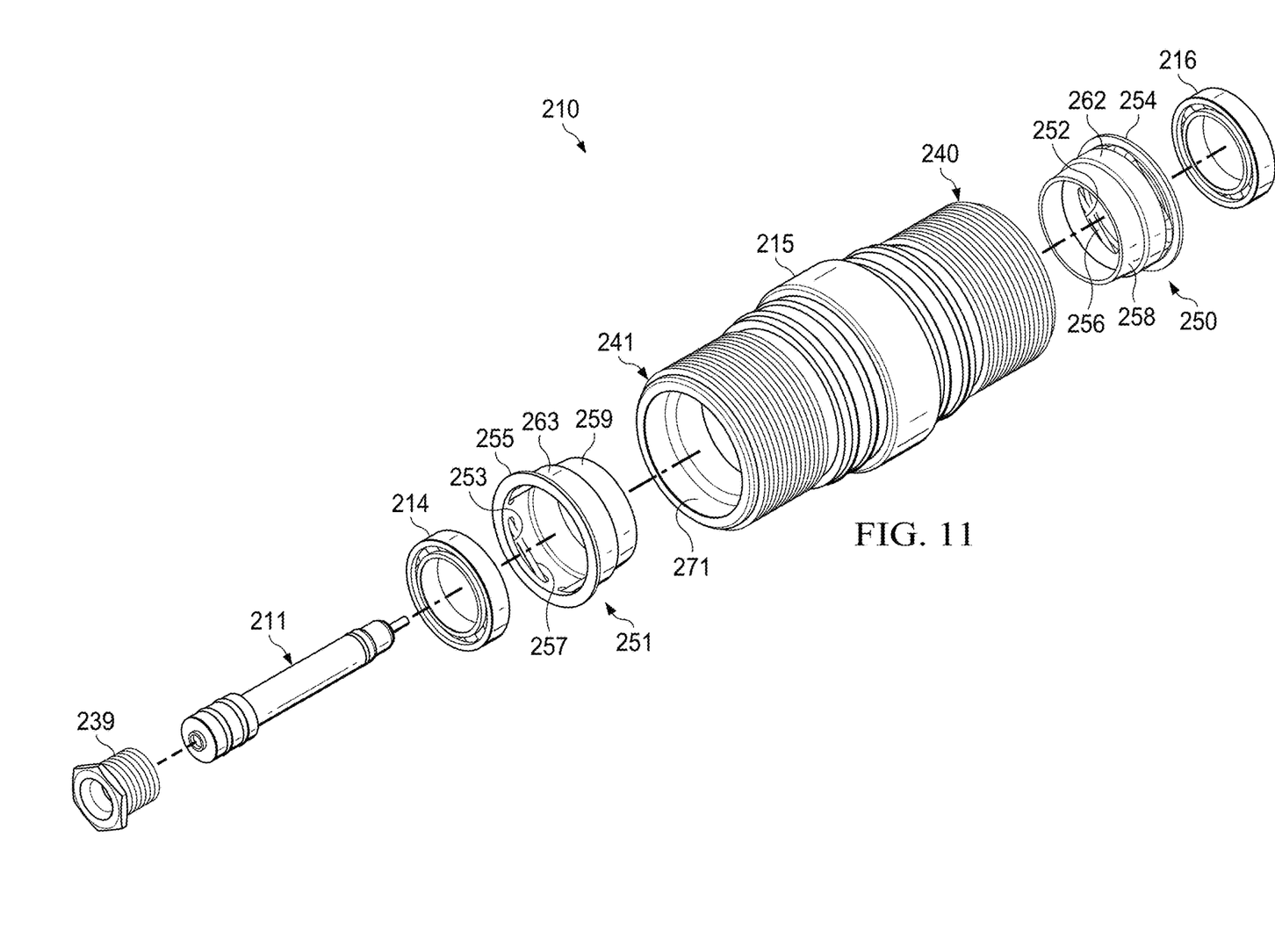
FIG. 11 shows an example embodiment of an orienting tandem sub.

An example embodiment as shown in FIGS. 10-11 may include a tandem assembly 210 comprising a tandem body 215 having first end 240 and a second end 241, connected by a thru hole passageway. The thru hole passageway is adapted to contain a feed through bulkhead 211 held in place by retaining nut 239. The first end 240 is adapted to contain a bearing sleeve 250 inserted therein. The bearing sleeve 250 includes a first bearing 216 held in place with retainer clips 256 that interface with retainer cutouts 252 in the bearing sleeve 250. The bearing sleeve 250 includes a cylindrical portion 262, a tapered portion 258, and a lip 254 that stops against the face of the first end 240.

Still referring to FIGS. 10-11, the second end 241 is adapted to contain a bearing sleeve 251 installed therein. The bearing sleeve 251 includes a second bearing 214 held in place with retainer clips 257 that interface with the retainer cutouts 253 in the bearing sleeve 251. The bearing sleeve 251 includes a cylindrical portion 263, a tapered portion 259, and a lip 255 that stops against the face of the second end 241.

Figure 12:
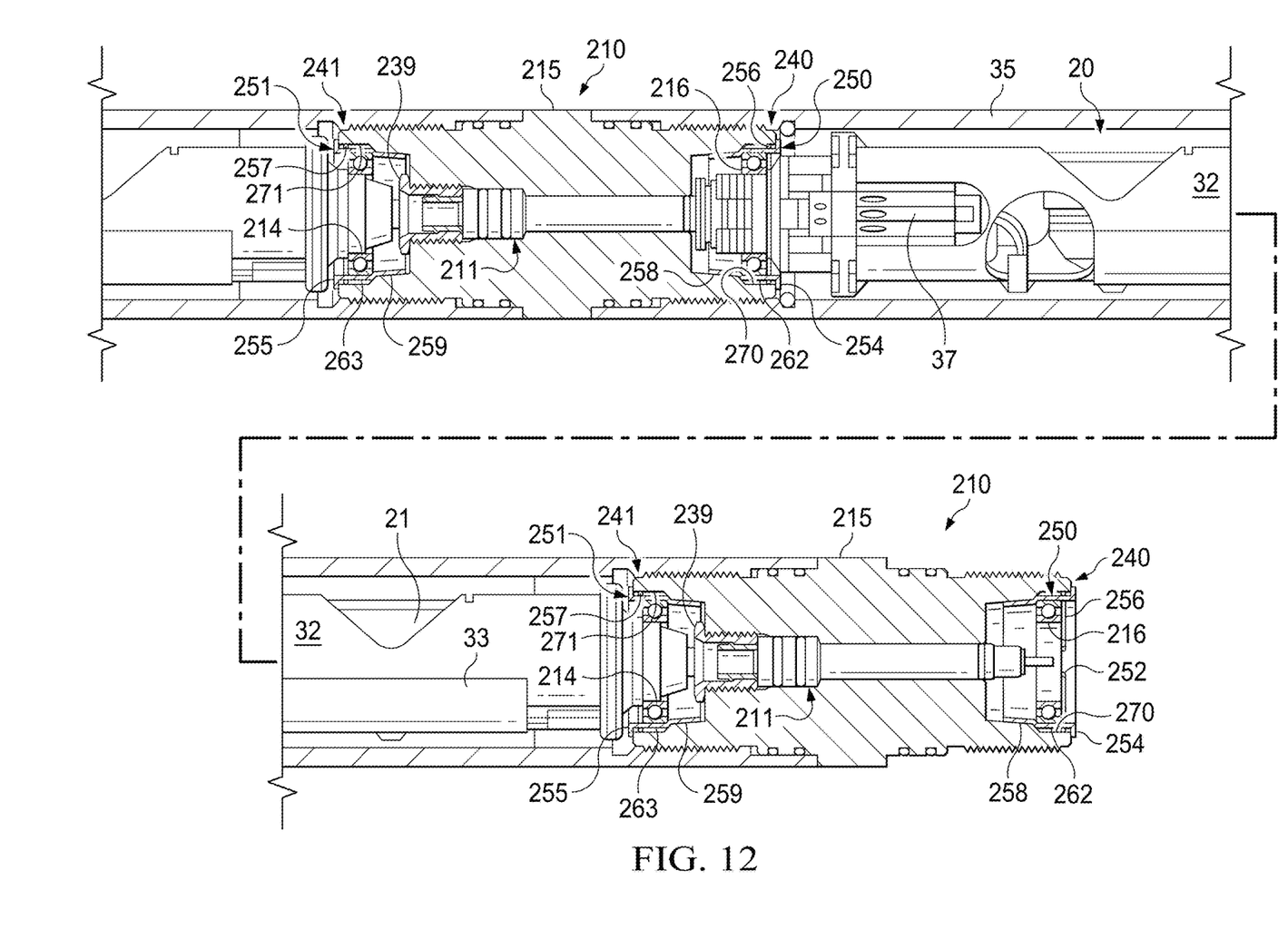
FIG. 12 shows an example embodiment of an orientating tandem sub coupled to the charge tube of a perforating gun.

An example embodiment shown in FIG. 12 shows two tandem assemblies 210 coupled to either end of a perforating gun 20. The perforating gun 20 includes a carrier gun housing 35. Charge tube 32 includes a counterweight 33. Charge tube 32 includes shaped charges 21. A detonator assembly 37 is explosively coupled to the shaped charges 21 via a detonating cord.

Referring to FIGS. 10-12, the tandem assembly 210 includes inner surface 270 at the first end 240 and inner surface 271 at the second end 241. During a detonation of a perforating gun the explosive force can destroy bearings, causing the contents of the bearings to impact and damage the tandem assembly, including the inner surfaces 270 and 271. The bearing sleeves 250 and 251 protect the inner surfaces 270 and 271. When a perforating gun coupled to the first end 240 is fired, the bearing sleeve 250 prevents the components of first bearing 216 from impacting the inner surface 270. Furthermore, the bearing sleeve 270 retains the first bearing 216 or its components if it is shattered during the firing. When a perforating gun coupled to the second end 241 is fired, the bearing sleeve 251 prevents the components of second bearing 214 from impacting the inner surface 271. Furthermore, the bearing sleeve 271 retains the second bearing 214 or its components if it is shattered during the firing. The components may include the ball bearings, roller bearings, tapered bearings, or other equivalent types of bearings.

In alternative embodiments, the tandem sub and perforating gun assembly may be configured with various materials and structural modifications to enhance performance in different operational environments. For instance, the rotational bearing mechanisms, typically composed of needle bearings, could be substituted with tapered roller bearings or spherical roller bearings to accommodate higher load capacities or to provide smoother rotation under extreme downhole pressures and temperatures. The outer housing of the tandem sub may be manufactured from high-strength, corrosion-resistant alloys, such as Inconel or titanium, to ensure durability in highly corrosive or sour gas environments. Additionally, the feed-through bulkhead could be adapted to include advanced sealing technologies, such as elastomeric or metal-to-metal seals, to further enhance the pressure integrity between connected perforating guns. In some embodiments, the charge tube assembly may incorporate modular design features, allowing for quick interchangeability of shaped charges or counterweights to customize the perforating gun system for specific wellbore conditions or targeted formations. These alternative embodiments provide flexibility and adaptability, ensuring the perforating gun system can be tailored to meet the varying demands of different well completion projects.

Using bearing sleeves in the tandem sub assembly, as described in the specification, offers several key benefits including enhanced protection because bearing sleeves provide an additional layer of protection for the rotational bearing mechanisms during the detonation of perforating charges. By containing the components of the bearing within the sleeve, the risk of damage to the tandem sub's inner surfaces is minimized, which can extend the lifespan of the equipment. Bearing sleeves make it easier to replace or service the bearings without needing to remove or disassemble the entire tandem sub. This modularity simplifies maintenance, reduces downtime, and minimizes operational disruptions. By protecting the tandem sub and its components from wear and tear, bearing sleeves can reduce the frequency of repairs and replacements. This results in lower operational costs over time, especially in harsh downhole environments where equipment is subjected to extreme conditions. The protective role of the bearing sleeves ensures that the bearings and the tandem sub can be reused multiple times, even after exposure to the high forces generated during perforation. This reusability is particularly valuable in reducing the overall cost of operations.

Bearing sleeves can provide improved performance by helping to maintain the alignment and smooth operation of the rotational bearing mechanisms. This ensures that the charge tubes rotate freely and accurately, which is crucial for the precise orientation of the perforating guns in the wellbore. If a bearing fails during operation, the bearing sleeve can contain the debris, preventing it from damaging other parts of the assembly. This containment helps preserve the integrity of the tandem sub and other critical components.

Bearing sleeves can be manufactured from various materials tailored to specific operational needs, such as high-temperature alloys for extreme environments or corrosion-resistant materials for use in sour gas wells. This flexibility allows the tandem sub to be optimized for different applications. The bearing sleeve can also act as a dampener, absorbing and mitigating vibrations that occur during the detonation process. This helps to stabilize the entire perforating gun assembly, contributing to more consistent and reliable performance.

An example embodiment may include an apparatus for connecting perforating gun assemblies, comprising a first rotational bearing mechanism disposed within a first sleeve located at a first end, wherein the first rotational bearing mechanism is adapted to engage with a first charge tube in a first perforating gun and allow the first charge tube to rotate freely, a second rotational bearing mechanism disposed within a second sleeve located at a second end, wherein the second rotational bearing mechanism is adapted to engage with a second charge tube in a second perforating gun and allow the second charge tube to rotate freely, and an outer housing adapted to engage with a first outer gun housing of the first perforating gun and engage with a second outer gun housing of the second perforating gun.

The example embodiment may further include a feed-through bulkhead installed within a through passage, wherein the feed-through bulkhead provides an electric contact between the first perforating gun and the second perforating gun while further providing a pressure seal between the first perforating gun and the second perforating gun. It may include a first retainer coupled to the first rotational bearing mechanism, wherein the first retainer retains and protects the first rotational bearing mechanism. It may include a second retainer coupled to the second rotational bearing mechanism, wherein the second retainer retains and protects the second rotational bearing mechanism.

The first rotational bearing mechanism may be a needle bearing or a tapered roller bearing. The second rotational bearing mechanism may be a needle bearing or a spherical roller bearing.

An example embodiment may include an apparatus for connecting perforating gun assemblies, comprising a tandem sub having an outer housing with a first end and a second end; a first rotational bearing mechanism disposed at the first end, adapted to engage with a first charge tube in a first perforating gun, a second rotational bearing mechanism disposed at the second end, adapted to engage with a second charge tube in a second perforating gun, and a modular feed-through bulkhead within the tandem sub, providing electrical connectivity and a pressure seal between the first and second perforating guns.

The tandem sub further may include a first retainer at the first end and a second retainer at the second end, wherein the retainers protect the rotational bearing mechanisms from damage during detonation. The modular feed-through bulkhead may include elastomeric seals to enhance pressure integrity between the perforating guns. It may include a charge tube assembly in each perforating gun, the charge tube assembly being modular to allow for interchangeable shaped charges or counterweights. The outer housing of the tandem sub may be composed of a corrosion-resistant alloy to ensure durability in sour gas environments. The tandem sub may include alignment features for ensuring the proper rotational orientation of the perforating guns within a wellbore. The rotational bearing mechanisms may be designed to accommodate high load capacities under extreme downhole conditions.

An example method for connecting perforating gun assemblies in a downhole environment may include providing a first perforating gun assembly with a first charge tube, providing a second perforating gun assembly with a second charge tube, inserting a first rotational bearing mechanism into a first sleeve at a first end of a tandem sub, wherein the first rotational bearing mechanism is adapted to engage the first charge tube of the first perforating gun, inserting a second rotational bearing mechanism into a second sleeve at a second end of the tandem sub, wherein the second rotational bearing mechanism is adapted to engage the second charge tube of the second perforating gun, coupling the tandem sub to the first and second perforating guns, allowing the first and second charge tubes to rotate freely within their respective perforating guns, and aligning the perforating guns in a desired orientation within a wellbore.

The example method may include installing a feed-through bulkhead within a through passage of the tandem sub, wherein the feed-through bulkhead provides electrical contact between the first perforating gun and the second perforating gun while also providing a pressure seal between them. It may include securing a first retainer to the first rotational bearing mechanism at the first end of the tandem sub, wherein the first retainer retains and protects the first rotational bearing mechanism during operation. It may include securing a second retainer to the second rotational bearing mechanism at the second end of the tandem sub, wherein the second retainer retains and protects the second rotational bearing mechanism during operation. It may include locking the perforating guns in the desired orientation using lock collar tandems, ensuring the perforation charges are directed accurately within the wellbore.

The first and second charge tubes may be weighted, and the allowing the charge tubes to self-orient within the perforating guns due to gravity when positioned in a horizontal wellbore. It may include using modular components within the charge tube assemblies to interchange shaped charges or counterweights, customizing the perforating gun system for specific wellbore conditions. It may include installing elastomeric seals within the feed-through bulkhead to enhance pressure integrity between the perforating guns. It may include coupling the outer housing of the tandem sub to the outer gun housings of the first and second perforating guns, ensuring a secure and pressure-tight connection.

The tandem sub and perforating guns may be deployed in a high-pressure, high-temperature downhole environment, and may include selecting rotational bearing mechanisms and materials suitable for withstanding extreme conditions. It may include testing the electrical continuity and pressure seals of the feed-through bulkhead before deploying the perforating gun assemblies into the wellbore. The tandem sub may include alignment features that assist in orienting the perforating guns to align the shaped charges with specific formations or wellbore targets. The tandem sub method may include detonating the shaped charges within the first and second perforating guns, wherein the rotational bearing mechanisms ensure minimal damage to the tandem sub and maintain the integrity of the assembly for potential reuse. The method may include disassembling the tandem sub and perforating guns after use, inspecting the rotational bearing mechanisms and feed-through bulkhead for wear or damage, and replacing any components as necessary for subsequent operations. It may include using a modular design for the tandem sub that allows for quick assembly and disassembly, reducing setup time and minimizing the risk of human error during downhole operations.

Although the example embodiments have been described in terms of embodiments which are set forth in detail, it should be understood that this is by illustration only and that the example embodiments are not necessarily limited thereto. For example, terms such as upper and lower or top and bottom can be substituted with uphole and downhole, respectfully. Top and bottom could be left and right, respectively. Uphole and downhole could be shown in figures as left and right, respectively, or top and bottom, respectively. Generally downhole tools initially enter the borehole in a vertical orientation, but since some boreholes end up horizontal, the orientation of the tool may change. In that case downhole, lower, or bottom is generally a component in the tool string that enters the borehole before a component referred to as uphole, upper, or top, relatively speaking. The first housing and second housing may be top housing and bottom housing, respectfully. In a gun string such as described herein, the first gun may be the uphole gun or the downhole gun, same for the second gun, and the uphole or downhole references can be swapped as they are merely used to describe the location relationship of the various components. Terms like wellbore, borehole, well, bore, oil well, and other alternatives may be used synonymously. Terms like tool string, tool, perforating gun string, gun string, or downhole tools, and other alternatives may be used synonymously. The alternative embodiments and operating techniques will become apparent to those of ordinary skill in the art in view of the present disclosure. Accordingly, modifications of the example embodiments are contemplated which may be made without departing from the spirit of the claimed example embodiments.

What is claimed is:

1. A tandem sub, used to connect one or more perforating gun assemblies, comprising: a first rotational mechanism disposed within a first sleeve located at a first end, wherein the first rotational mechanism is adapted to engage with a first charge tube in a first perforating gun and allow the first charge tube to rotate freely; a second rotational mechanism disposed within a second sleeve located at a second end, wherein the second rotational mechanism is adapted to engage with a second charge tube in a second perforating gun and allow the second charge tube to rotate freely; and an outer tandem housing, wherein the outer housing is adapted to engage a first outer gun housing of the first perforating gun and engage a second outer gun housing of the second perforating gun; and a feed through bulkhead installed within a through passage, wherein the feed through bulkhead provides an electric contact between the first perforating gun and the second perforating gun while further providing a pressure seal between the first perforating gun and the second perforating gun.

2. The tandem sub of claim 1 further comprising a first retainer coupled to the first rotation mechanism, wherein the first retainer retains and protects the first rotational mechanism.

3. The tandem sub of claim 1 further comprising a second retainer coupled to the second rotation mechanism, wherein the second retainer retains and protects the first rotational mechanisms.

4. The tandem sub of claim 1 wherein the first rotation mechanism is a needle bearing.

5. The tandem sub of claim 1 wherein the second rotation mechanism is a needle bearing.

6. The tandem sub of claim 1 further comprising a first retainer coupled to the first rotation mechanism, wherein the first retainer retains and protects the first rotational mechanism.

7. The tandem sub of claim 1 further comprising a second retainer coupled to the second rotation mechanism, wherein the second retainer retains and protects the first rotational mechanisms.

8. A perforating gun system comprising: a first perforating gun with a first charge tube; a second perforating gun with a second charge tube; a first tandem sub, used to connect one or more perforating gun assemblies, further comprising: a first rotational mechanism disposed within a first sleeve located at a first end, wherein the first rotational mechanism is coupled with the first charge tube in the first perforating gun; a second rotational mechanism disposed within a second sleeve located at a second end, wherein the second rotational mechanism is coupled with the second charge tube in the second perforating gun; and a feed through bulkhead installed within a through passage in the first tandem sub, wherein the feed through bulkhead provides an electric contact between the first perforating gun and the second perforating gun while further providing a pressure seal between the first perforating gun and the second perforating gun.

9. The perforating gun system of claim 8, further comprising a top end fitting coupling a first end of the first charge tube to the first rotational mechanism, wherein the top end fitting is made of non-conductive material.

10. The perforating gun system of claim 9, further comprising an electrical contact protruding outward from the top end fitting into the feed through bulkhead.

11. The perforating gun system of claim 10, further comprising a wired connection connecting the top end fitting electrical contact to the input wire of a controller switch contained within the top end fitting.

12. The perforating gun system of claim of claim 11, further comprising a through wire running the length of the first charge tube connecting an output wire of the controller switch to the electrical contact on a bottom end fitting.

13. The perforating gun system of claim of claim 9, further comprising a bottom end fitting on a second end of the charge tube.

14. The perforating gun system of claim of claim 13, wherein the bottom end fitting is composed of non-conductive material with an electrical contact protruding outward from the center of the bottom end fitting body.

15. The perforating gun system of claim 9, wherein the top end fitting of the first charge tube assembly is supported by the first rotational mechanisms in the first tandem sub.

16. The perforating gun system of claim 8, further comprising the first tandem sub having an outer tandem housing, wherein the outer housing is adapted to engage a first outer gun housing of the first perforating gun and engage a second outer gun housing of the second perforating gun.

17. The perforating gun system of claim 8, wherein the first charge tube is weighted and freely rotates within the first perforating gun.

18. The perforating gun system of claim 8, wherein the second charge tube is weighted and freely rotates within the second perforating gun.

19. The perforating gun system of claim 8 further comprising a first retainer coupled to the first rotation mechanism, wherein the first retainer retains and protects the first rotational mechanism.

20. The Perforating gun system of claim 8 further comprising a second retainer coupled to the second rotation mechanism, wherein the second retainer retains and protects the first rotational mechanisms.

* * * * *